(12) United States Patent
Yamashita

(10) Patent No.: US 8,003,714 B2
(45) Date of Patent: Aug. 23, 2011

(54) INK, INK SET, INK CARTRIDGE AND INK EJECTING APPARATUS

(75) Inventor: Yoshiro Yamashita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 450 days.

(21) Appl. No.: 11/938,388

(22) Filed: Nov. 12, 2007

(65) Prior Publication Data

US 2008/0132610 A1 Jun. 5, 2008

(30) Foreign Application Priority Data

Dec. 4, 2006 (JP) ................................. 2006-326890

(51) Int. Cl.
*C09D 11/00* (2006.01)
*B41J 2/01* (2006.01)
*C08L 5/00* (2006.01)

(52) U.S. Cl. ............ 523/160; 523/161; 524/27; 524/56; 524/58; 106/31.13; 106/31.6; 106/31.68; 347/86; 347/100

(58) Field of Classification Search .................. 523/160, 523/161; 106/31.13, 31.6, 31.68; 524/27, 524/56, 58

See application file for complete search history.

(56) References Cited

U.S. PATENT DOCUMENTS

| | | | |
|---|---|---|---|
| 6,966,944 B2 * | 11/2005 | Shimomura et al. ....... | 106/31.43 |
| 2001/0025588 A1 * | 10/2001 | Takemoto et al. ......... | 106/31.36 |
| 2002/0017219 A1 * | 2/2002 | Yamazaki et al. ......... | 106/31.68 |
| 2002/0077384 A1 * | 6/2002 | Sano et al. ............... | 523/160 |
| 2002/0169232 A1 * | 11/2002 | Yatake ..................... | 523/160 |
| 2003/0008938 A1 * | 1/2003 | Sano et al. ............... | 523/160 |
| 2003/0069329 A1 * | 4/2003 | Kubota et al. ............ | 523/160 |
| 2003/0236321 A1 * | 12/2003 | Sano et al. ............... | 523/160 |
| 2005/0229811 A1 * | 10/2005 | Kato et al. ............... | 106/31.43 |
| 2006/0119680 A1 * | 6/2006 | Kato et al. ............... | 347/100 |

FOREIGN PATENT DOCUMENTS

| | | |
|---|---|---|
| JP | 4-332775 | 11/1992 |
| JP | 6-157955 | 6/1994 |
| JP | 6-200200 | 7/1994 |
| JP | 2004-210902 | 7/2004 |

* cited by examiner

*Primary Examiner* — David Wu
*Assistant Examiner* — Vu A Nguyen
(74) *Attorney, Agent, or Firm* — Fildes & Outland, P.C.

(57) ABSTRACT

An ink comprising a pigment, a dispersant, a penetrating agent, water, a compound having two hydroxyl groups in the molecule, a compound having three hydroxyl groups in the molecule, and a compound having four or more hydroxyl groups in the molecule, the content of the pigment being in the range of from about 7% by weight to about 20% by weight;

the content of the compound having two hydroxyl groups in the molecule being in the range of from about 1% by weight to about 10% by weight;

the content of the compound having three hydroxyl groups in the molecule being in the range of from about 2% by weight to about 20% by weight; and the content of the compound having four or more hydroxyl groups in the molecule being in the range of from about 25% by weight to about 50% by weight.

21 Claims, 4 Drawing Sheets

INK, INK SET, INK CARTRIDGE AND INK EJECTING APPARATUS

CROSS-REFERENCE TO RELATED APPLICATION

This application is based on and claims priority under 35 USC 119 from Japanese Patent Application No. 2006-326890 filed Dec. 4, 2006.

BACKGROUND

1. Technical Field

The invention is related to an ink, an ink set, an ink cartridge and an ink ejecting apparatus.

2. Related Art

Inks used for ink jet recording, by a commercially available ink jet printer and the like, are generally classified into the following two categories: inks containing a self-dispersible pigment that is capable of dissolving in a solvent such as water by itself, and inks containing a non-dispersible pigment that is not capable of dissolving in a solvent such as water by itself.

SUMMARY

According to an aspect of the invention, there is provided an ink comprising a pigment, a dispersant, a penetrating agent, water, a compound having two hydroxyl groups in the molecule, a compound having three hydroxyl groups in the molecule, and a compound having four or more hydroxyl groups in the molecule, the content of the pigment being in the range of from about 7% by weight to about 20% by weight;

the content of the compound having two hydroxyl groups in the molecule being in the range of from about 1% by weight to about 10% by weight;

the content of the compound having three hydroxyl groups in the molecule being in the range of from about 2% by weight to about 20% by weight; and the content of the compound having four or more hydroxyl groups in the molecule being in the range of from about 25% by weight to about 50% by weight.

BRIEF DESCRIPTION OF THE DRAWINGS

Exemplary embodiments of the present invention will be described in detail based on the following figures, wherein.

DETAILED DESCRIPTION

<Ink>

Figure 1:
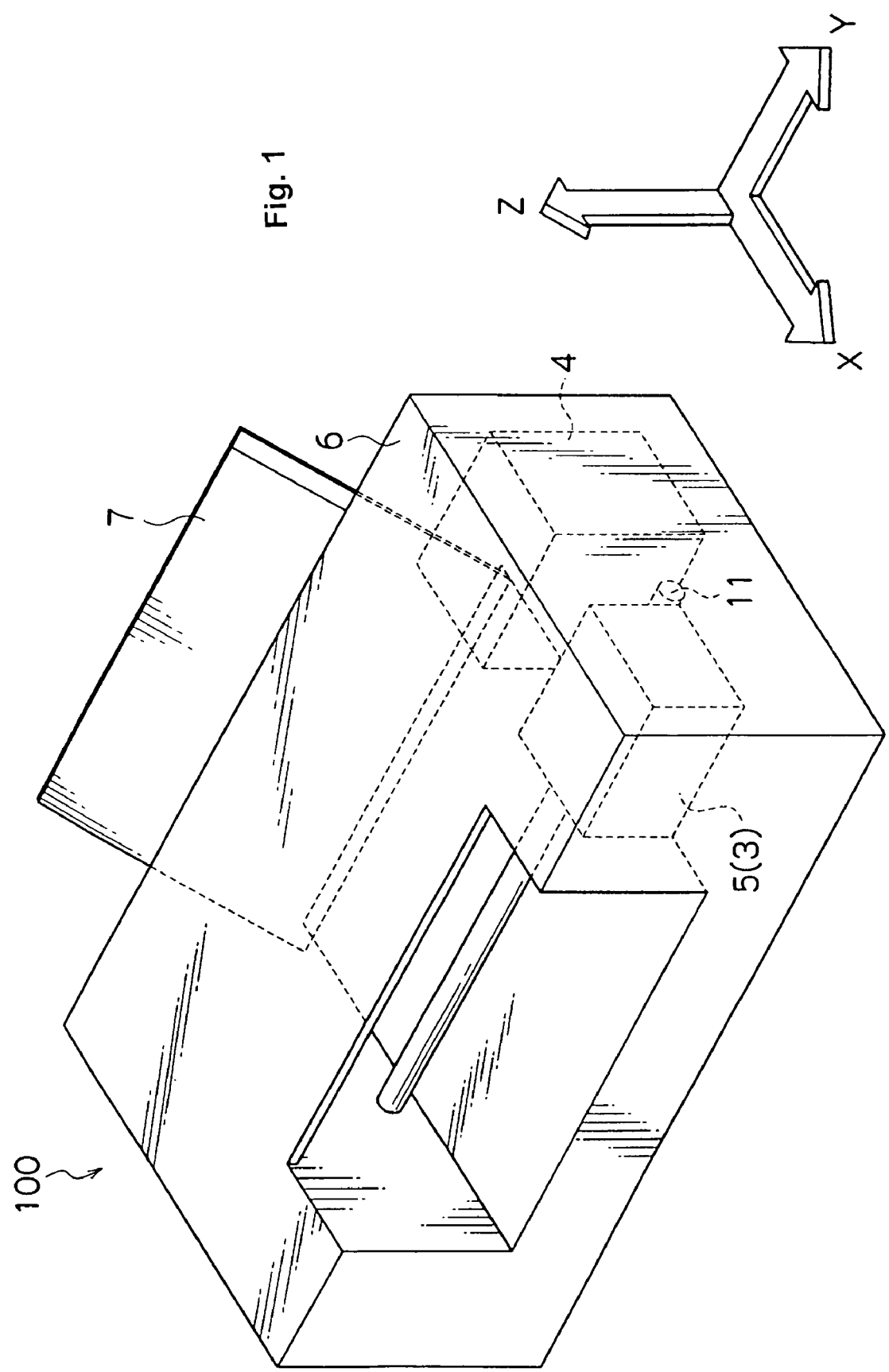
FIG. 1 is a perspective view of an appearance of an exemplary embodiment of the recording apparatus of the invention.

"Pigments" used in the embodiments of the invention are combined with a dispersant to disperse the pigment in an ink. More specifically, the invention is related to an ink containing a pigment that is difficult to maintain a dispersed state thereof by themselves. Such pigments are conventionally contained in an ink in the range of from 1% or about 1% by weight to 6% or about 6% by weight, because clogging in nozzles of a recording head may be caused when the pigment content exceeds 7% or about 7% by weight.

On the other hand, the ink used in the embodiments of the invention can contain a non-self-dispersible pigment in the range of as high as from 7% or about 7% by weight to 20% or about 20% by weight, as compared with the conventional inks containing a non-self-dispersible pigment. Therefore, according to the invention, an image having a higher density can be formed with the same amount of the ink applied per area as compared with the conventional inks containing a non-self-dispersible pigment. In other words, the amount of the ink to be applied per area to form an image having an equal degree of density can be reduced, and therefore the image forming speed can be increased.

When the content of the pigment in the ink used in the embodiments of the invention is less than 7% or about 7% by weight, formation of an image having a high density may be difficult. On the other hand, when the content of the pigment in the ink is more than 20% or about 20% by weight, nozzle clogging may occur. The content of the pigment in the ink used in the embodiments of the invention is preferably in the range of from 9% or about 9% by weight to 15% or about 15% by weight, and more preferably in the range of from 9% or about 9% by weight to 13% or about 13% by weight.

The ink used in the embodiments of the invention contains a compound having four or more hydroxyl groups in the molecule and, therefore, curling of a recording medium due to evaporation of moisture after image formation can be prevented. The content of the compound having four or more hydroxyl groups in the molecule is in the range of from 25% or about 25% by weight to 50% or about 50% by weight, preferably in the range of from 28% or about 28% by weight to 45% or about 45% by weight, and more preferably in the range of from 30% or about 30% by weight to 40% or about 40% by weight.

When the content of the compound having four or more hydroxyl groups in the molecule is less than 25% or about 25% by weight, curling of a recording medium may not be prevented. On the other hand, when the content of the compound having four or more hydroxyl groups in the molecule is more than 50% or about 50% by weight, nozzle clogging may occur.

The content of the pigment in the ink used in the embodiments of the invention is in the range of from 7% or about 7% by weight to 20% or about 20% by weight, which is higher than that of conventional inks. Therefore, the possibility of the occurrence of nozzle clogging is potentially high.

In addition, the compound having four or more hydroxyl groups in the molecule has a tendency to precipitate in an ink when the ink contains only the compound and other components having a poor compatibility with the compound. In this case, precipitation of the compound having four or more hydroxyl groups in the molecule may increase the possibility of nozzle clogging. In addition, the compound having four or more hydroxyl groups in the molecule tends to decrease the dispersion stability of the pigment. The reason for this tendency is not clear, but is presumed that the interaction of the compound with the dispersant is so intense that the original functions of the dispersant are suppressed. Further, the ink used in the embodiments of the invention contains the compound having four or more hydroxyl groups in the molecule at a level as high as from 25% or about by 25% by weight to 50% or about 50% by weight. Therefore, considering only the fact that the ink used in the embodiments of the invention contains a pigment and the compound having four or more hydroxyl groups in the molecule, the ink should thus be considered to have a high potential to cause nozzle clogging and a significantly low level of dispersion stability of the pigment.

Consequently, because of such inferior practicality as described above, inks containing a pigment and a compound having four or more hydroxyl groups in the molecule at such high concentrations as the ink used in the embodiments of the invention have not been specifically taken into consideration as conventional inks containing a non-self-dispersive pigment.

However, an ink containing a pigment and a compound having four or more hydroxyl groups in the molecule at high concentrations has, at the same time, such favorable properties as forming an image with a higher image density and preventing curling of a recording medium more effectively, in comparison with conventional inks.

In view of the above, the inventor has found that it is effective, in order to alleviate the drawbacks of nozzle clogging and dispersion instability while maintaining the advantages mentioned above, to further add a compound having two hydroxyl groups in the molecule and a compound having three hydroxyl groups in the molecule.

The reasons for the above are assumed to be as follows.

First, a compound having two or three hydroxyl groups in the molecule has a high degree of compatibility with a compound having four or more hydroxyl groups in the molecule. This may contribute to suppressing precipitation of the compound having four or more hydroxyl groups in the molecule in the ink, thereby reducing nozzle clogging caused by the precipitation of the compound. In addition, keeping the compound having four or more hydroxyl groups in the molecule in a state of being dissolved in the ink may also contribute to reducing nozzle clogging by suppressing evaporation of moisture from the ink because the compound has a high degree of moisture retention ability.

Second, it is thought that the presence of the compound having two hydroxyl groups in the molecule and the compound having three hydroxyl groups in the molecule in the ink reduces the interaction among pigment particles, as if offsetting the action of the compound having four or more hydroxyl groups in the molecule whereby the dispersion stability of the pigment is decreased, thereby ensuring the dispersion stability of the pigment.

It is also thought that the compound having three hydroxyl groups in the molecule may contribute to preventing nozzle clogging at a time of ejecting ink from a recording head after the ejection has not been performed for a long period of time (for example, several days to one week or more), when included in the ink together with the compound having four or more hydroxyl groups in the molecule.

On the other hand, the compound having two hydroxyl groups in the molecule is thought to contribute to preventing nozzle clogging at a time of ejecting ink from a recording head after the ejection has not been performed for a short period of time (for example, several seconds to several minutes), when included in the ink together with the compound having four or more hydroxyl groups in the molecule.

Consequently, it is thought that by including both of the compound having two hydroxyl groups in the molecule and the compound having three hydroxyl groups in the molecule in the ink together with the compound having four or more hydroxyl groups in the molecule, nozzle clogging may be prevented both when image formation is carried out after a long-term suspension of the ink ejecting apparatus, and where ink ejection is carried out including intermittent stoppages.

The content of the compound having two hydroxyl groups in the molecule in the ink is in the range of from 1% or about 1% by weight to 10% or about 10% by weight, preferably in the range of from 3% or about 3% by weight to 10% or about 10% by weight, and more preferably in the range of from 3% or about 3% by weight to 8% or about 8% by weight, with respect to the total amount of the ink.

When the above content is less than 1% or about 1% by weight, nozzle clogging may occur when the ink ejecting apparatus carries out image formation after being left for a long time. From the viewpoint of preventing nozzle clogging, the content of the compound having two hydroxyl groups in the molecule is preferably higher. However, if the content is more than 10% or about 10% by weight, the contents of other components in the ink may not be enough, which may cause difficulty in satisfying both of clogging prevention and other properties.

The above content of the compound having three hydroxyl groups in the molecule in the ink is in the range of from 2% or about 2% by weight to 20% or about 20% by weight, preferably in the range of from 3% or about 3% by weight to 18% or about 18% by weight, and more preferably in the range of from 5% or about 5% by weight to 15% or about 15% by weight.

When the content is less than 2% or about 2% by weight, nozzle clogging may occur at a time of performing ink ejection with intermittent stoppages during image formation. From the viewpoint of preventing nozzle clogging, the content of the compound having three hydroxyl groups in the molecule is preferably higher. However, if the content is more than 20% or about 20% by weight, the contents of other components in the ink may not be enough, which may cause difficulty in satisfying both of clogging prevention and other properties.

Further, in a case where the content of the compound having two hydroxyl groups in the molecule is less than 1% or about 1% by weight and the content of the compound having three hydroxyl groups in the molecule is less than 2% or about 2% by weight, it may become difficult to dissolve the compound having four or more hydroxyl groups in the molecule in the ink, and thereby causing nozzle clogging.

Accordingly, in order to prevent nozzle clogging caused by precipitation of the compound having four or more hydroxyl groups in the molecule, the total content of the compound having two hydroxyl groups in the molecule and the compound having three hydroxyl groups in the molecule is 3% or about 3% by weight or more, preferably 6% or about 6% by weight or more, and more preferably 8% or about 8% by weight or more.

Examples of the components contained in the ink used in the embodiments of the invention will now be described in more detail.

—Pigment—

The pigment used in the embodiments of the invention may be any known pigments that may be organic or inorganic, as long as it can disperse in ink substantially with the aid of a dispersant. More specifically, pigments which are self-dispersible in water are excluded from the examples.

Preferable examples of black pigments include carbon black pigments such as furnace black, lamp black, acetylene black and channel black, and specific examples thereof include Raven 7000, Raven 5750, Raven 5250, Raven 5000 ULTRAII, Raven 3500, Raven 2500 ULTRA, Raven 2000, Raven 1500, Raven 1255, Raven 1250, Raven 1200, Raven 1190 ULTRAII, Raven 1170, Raven 1080 ULTRA, Raven 1060 ULTRA, Raven 790 ULTRA, Raven 780 ULTRA, Raven 760 ULTRA (all manufactured by Columbian Chemical Company), Regal 400R, Regal 330R, Regal 660R, Black Pearls L, Mogul L, Monarch 700, Monarch 800, Monarch 880, Monarch 900, Monarch 1000, Monarch 1100, Monarch 1300, Monarch 1400 (all manufactured by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all manufactured by Degussa), and No. 25, No. 33, No. 40, No. 47, No. 52, No. 900, No. 2300, MCF-88, MA600, MA7, MA8, MA100 (all manufactured by Mitsubishi Chemical Corporation).

In addition, particles of magnetic substances such as magnetite or ferrite, and black titanium oxide may also be used as a black pigment.

Examples of cyan pigments include, but not limited to, C. I. Pigment Blue-1, C. I. Pigment Blue-2, C. I. Pigment Blue-3, C. I. Pigment Blue-15, C. I. Pigment Blue-15:1, C. I. Pigment Blue-15:3, C. I. Pigment Blue-15:4, C. I. Pigment Blue-16, C. I. Pigment Blue-22, and C. I. Pigment Blue-60.

Examples of magenta pigments include, but not limited to, C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, and C. I. Pigment Red 202.

Examples of yellow pigments include, but not limited to, C. I. Pigment Yellow-1, C. I. Pigment Yellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I. Pigment Yellow-98, C. I. Pigment Yellow-114, C. I. Pigment Yellow-128, C. I. Pigment Yellow-129, C. I. Pigment Yellow-151, and C. I. Pigment Yellow-154.

In addition to the black pigment and pigments of three primary colors of cyan, magenta, and yellow, examples of other usable pigments include specific color pigments of red, green, blue, brown, white and the like, metallic luster pigments of gold, silver and the like, colorless body pigments and plastic pigments. Newly synthesized pigments for the embodiments of the invention may also be used.

—Dispersant—

The dispersant used to disperse the pigment is, for example, a resin (hereinafter may be referred to as "polymer dispersant"), which may be used in combination with later-described surfactants or the like, as necessary.

The polymer dispersant may effectively work as long as it is a polymer having a hydrophilic moiety and a hydrophobic moiety. Examples of such polymers having a hydrophilic moiety and a hydrophobic moiety include condensed polymers and addition polymers. Examples of the condensed polymers include known polyester dispersants. Examples of the addition polymers include those of monomers having an α,β-ethylenic unsaturated group. The intended polymer dispersant may be obtained by selecting and copolymerizing a monomer having an α,β-ethylenic unsaturated group containing a hydrophilic group, and a monomer having an α,β-ethylenic unsaturated group containing a hydrophobic group. Homopolymers of monomers having an α,β-ethylenic unsaturated group containing a hydrophilic group may also be used.

Examples of the monomers having an α,β-ethylenic unsaturated group containing a hydrophilic group include monomers having a carboxyl group, a sulfonic acid group, a hydroxyl group, or a phosphoric acid group, Specific examples thereof include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl acetate (starting material for polyvinyl alcohol), acrylamide, methacryloxy ethyl phosphate, bis-methacryloxy ethyl phosphate, methacryloxy ethylphenyl acid phosphate, ethyleneglycol dimethacrylate, and diethyleneglycol dimethacrylate.

Examples of the monomers having an α,β-ethylenic unsaturated group containing a hydrophobic group include styrene, styrene derivatives such as α-methylstyrene and vinyltoluene, vinyl cyclohexane, vinyl naphthalene, vinyl naphthalene derivatives, alkyl acrylates, phenyl acrylates, alkyl methacrylates, phenyl methacrylates, cycloalkyl methacrylates, alkyl crotonates, dialkyl itaconates, and dialkyl maleates.

Examples of preferable copolymers obtained from these monomers include a styrene-styrene sulfonate copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, an alkyl acrylate-acrylic acid copolymer, an alkyl methacrylate-methacrylic acid copolymer, a styrene-alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, and a styrene-methacrylic acid copolymer.

These copolymers may further contain a monomer having a polyoxyethylene group or a hydroxyl group as a copolymerization component.

The copolymers may have a structure of random, block, or grafted. Other examples of the copolymers include polystyrene sulfonic acid, polyacrylic acid, polymethacrylic acid, polyvinylsulfonic acid, polyalginic acid, a polyoxyethylene-polyoxypropylene-polyoxyethylene block copolymer, formaldehyde-naphthalene sulfonic acid condensate, polyvinyl pyrrolidone, polyethyleneimine, polyamines, polyamides, polyvinyl imidazoline, an aminoalkyl acrylate-acrylamide copolymer, chitosan, polyoxyethylene fatty acid amide, polyvinyl alcohol, polyacrylamide, cellulose derivatives such as carboxymethyl cellulose and carboxyethyl cellulose, polysaccharides and derivatives thereof. It is preferable that at least one of the hydrophilic groups contained in the dispersant is a carboxyl group.

The molecular weight of the polymer dispersant (weight average molecular weight in terms of styrene measured by GPC (gel permeation chromatography)) is preferably in the range of 8,000 to 100,000, and more preferably in the range of 10,000 to 50,000. If the molecular weight is less than 8,000, dispersion stability of the pigment may be reduced, and if the molecular weight is more than 100,000, viscosity of the ink may increase to adversely affect the ink ejection property.

The molecular weight here is measured by GPC using "HLC-8120GPC, SC-8020 (manufactured by Tosoh Corporation)", two columns of "TSK gel, Super HM-H (6.0 mm I.D.×15 cm, manufactured by Tosoh Corporation)", and THF (tetrahydrofuran) as an eluent. The measurement conditions are as follows: sample concentration, 0.5%; flow rate, 0.6 ml/min.; sample injection amount, 10 µl; measurement temperature, 40° C. An IR detector is used for measurement. The calibration curve is prepared from ten samples of "Polystyrene Standard Sample TSK Standard": "A-500", "F-1", "F-10", "F-80", "F-380", "A-2500", "F-4", "F-40", "F-128", and "F-700" (manufactured by Tosoh Corporation).

Examples of neutralizing agents used for neutralizing the polymer dispersant include alkali metals such as Na and Li, organic amines such as triethanolamine and diethanolamine, and combinations of two or more of these neutralizing agents. The type and addition amount of the neutralizing agent may be appropriately determined in order to achieve intended acid value and neutralization degree.

The acid value of the polymer dispersant is preferably 50 to 400, more preferably 60 to 250, and further preferably 70 to 200. The method for measuring the acid value may be any known methods such as, for example, a method in accordance with JIS K0070. More specifically, the acid value may be measured by performing neutralization titration of the resin dissolved in an organic solvent such as THF or toluene with a neutralizing agent (KOH).

The neutralization degree of the dispersant used for the ink is preferably 20 to 100%, more preferably 30 to 90%, and further preferably 40 to 80%. If the neutralization degree of the dispersant is less than 20%, the pigment in the ink at an initial stage after preparation may not be stably dispersed. On the other hand, if the neutralization degree is more than 100%, the ejection property of the ink may deteriorate when the ink is stored for a long period of time, as well as the case of an initial stage after preparation.

The neutralization degree may be calculated from the quantitation results of the aforementioned measurement of acid value, according to the following formula (1).

$$\text{Neutralization degree} = \text{neutralizing agent }(g)/\text{resin }(g)/\text{neutralizing agent (molecular weight)}/(\text{acid value}/56100) \quad \text{Formula (1)}$$

—Penetrating Agent—

A penetrating agent is a substance used for improving wettability and permeability of the ink into a recording medium, and agents such as a surfactant and a low molecular organic solvent can be used for the penetrating agent.

The content of a penetrating agent in the ink is not particularly limited, but is preferably in the range of from 0.5% or about 0.5% by weight to 20% or about 20% by weight, and more preferably in the range of from 1% or about 1% by weight to 15% or about 15% by weight. If the content of the penetrating agent is less than 0.5% or about 0.5% by weight, the ink may reduce its drying property. From the viewpoint of securing the drying property, the content of the penetrating agent is preferably higher. However, if the content of the penetrating agent is more than 20% or about 20% by weight, the contents of other components in the ink may not be enough, which may cause difficulty in satisfying both of the drying property and other properties.

When a surfactant is used as the penetrating agent, the content of the surfactant in the ink is preferably in the range of from 0.5% or about 0.5% by weight to 10% or about 10% by weight, and more preferably in the range of from 0.7% or about 0.7% by weight to 5% or about 5% by weight.

When a low molecular organic solvent is used as the penetrating agent, the content of the low molecular organic solvent in the ink is preferably in the range of from 3% or about 3% by weight to 20% or about 20% by weight, and more preferably in the range of from 3% or about 3% by weight to 15% or about 15% by weight. When the content of the surfactant or the low molecular organic solvent is outside the above-described ranges, it may become difficult to maintain the drying property of the ink, or achieve both of the drying property and other properties.

In any cases of using a surfactant, a low molecular organic solvent, or a combination thereof as the penetrating agent, the content of the penetrating agent (or the total content of the penetrating agents) is preferably adjusted to be in the range of from 0.5% or about 0.5% by weight to 20% or about 20% by weight.

The surfactant is preferably a nonionic surfactant from the viewpoint of dispersibility of the pigment. Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerol fatty acid esters, polyoxyethylene glycerol fatty acid esters, polyglycerol fatty acid esters, sucrose fatty acid esters, polyoxyethylene alkylamines, polyoxyethylene fatty acid amides, alkyl alkanol amides, polyethylene glycol polypropylene glycol block copolymers, acetylene glycol, and polyoxyethylene adducts of acetylene glycol.

The surfactants are more preferably polyoxyethylene nonylphenyl ethers, polyoxyethylene octylphenyl ethers, polyoxyethylene dodecylphenyl ethers, polyoxyethylene alkyl ethers, polyoxyethylene fatty acid esters, sorbitan fatty acid esters, polyoxyethylene sorbitan fatty acid esters, fatty acid alkylol amides, polyethylene glycol polypropylene glycol block copolymers, acetylene glycol, and polyoxyethylene adducts of acetylene glycol.

These surfactants may be used alone or in combination of two or more. The HLB of the surfactant (the value representing the degree of affinity of the surfactant to water and oil) is preferably in the range of 5 to 20, and more preferably in the range of 10 to 20, considering dissolution stability and the like. The HLB here refers to a value determined by Griffin's method, and is expressed by the following formula (2).

$$\text{HLB value} = 20 \times \text{total formula weight of hydrophilic moiety}/\text{molecular weight} \quad \text{Formula (2)}$$

The low molecular organic solvent may be an organic solvent having a molecular weight of from 50 to 400 and having no hydroxyl group in the molecule, or an organic solvent having a molecular weight of from 40 to 400 and having only one hydroxyl group in the molecule.

Examples of the organic solvents having no hydroxyl group in the molecule include nitrogen-containing solvents such as pyrrolidone, N-methyl-2-pyrrolidone and cyclohexyl pyrrolidone, and sulfur-containing solvents such as sulfolane and dimethyl sulfoxide. Further, propylene carbonate, ethylene carbonate and the like may also be used.

Examples of the organic solvents having only one hydroxyl group in the molecule include alcohols and glycol ethers. Specific examples include ethanol, isopropyl alcohol, n-propyl alcohol, butyl alcohol, benzyl alcohol, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, diethylene glycol monohexyl ether, propylene glycol monopropyl ether, propylene glycol monobutyl ether, dipropylene glycol monoethyl ether, dipropylene glycol monopropyl ether, dipropylene glycol monobutyl ether, triethylene glycol monopropyl ether, triethylene glycol monobutyl ether, and triethylene glycol monohexyl ether.

—Water—

The water used here is preferably, for example, ion exchanged water, ultra pure water, distilled water, or ultra filtrate water, particularly for the purpose of preventing inclusion of impurities.

—Compound Having Two Hydroxyl Groups in the Molecule—

The compound having two hydroxyl groups in the molecule is, for example, a compound having a molecular weight in the range of 40 or about 40 to 1,000 or about 1,000 and a vapor pressure at 20° C. of not more than 100 Pa or about 100 Pa. The molecular weight of the compound is preferably in the range of 50 or about 50 to 500 or about 500, and the vapor pressure at 20° C. is preferably in the range of 0.0001 Pa or about 0.0001 Pa to 50 Pa or about 50 Pa.

Examples of the compounds having two hydroxyl groups in the molecule include diethylene glycol, triethylene glycol, tetraethylene glycol, 1,2-butanediol, ethylene glycol, propylene glycol, dipropylene glycol, 1,3-butanediol, 2,3-butanediol, 1,5-pentanediol, neopentyl glycol, 1,6-hexanediol, 1,2-hexanediol, thiodiglycol, and diethanolamine.

When the compound having two hydroxyl groups in the molecule has such a chemical structure that the two hydroxyl groups are respectively bonded to the carbon atoms being adjacently arranged, the compound can also serve as a penetration enhancing agent due to a function of facilitating penetration of the ink into the recording medium.

—Compound Having Three Hydroxyl Groups in the Molecule—

The compound having three hydroxyl groups in the molecule is, for example, a compound having a molecular weight in the range of 70 or about 70 to 1,000 or about 1,000 and a vapor pressure at 20° C. of not more than 10 Pa or about 10 Pa. The molecular weight of the compound is preferably in the range of 80 or about 80 to 500 or about 500, and the vapor pressure at 20° C. is preferably in the range of 0.0001 Pa or about 0.0001 Pa to 5 Pa or about 5 Pa.

Examples of the compounds having three hydroxyl groups in the molecule include glycerol, trimethylolpropane, 1,2,6-hexanetriol, oxyethylene adducts of glycerol, oxypropylene adducts of glycerol, oxyethylene adducts of trimethylolpropane, triethanolamine, and thiodiglycerol.

—Compound Having Four or More Hydroxyl Groups in the Molecule—

The compound having four or more hydroxyl groups in the molecule is, for example, a compound having a molecular weight in the range of 100 or about 100 to 1,000 or about 1,000, and a vapor pressure at 20° C. of not more than 10 Pa or about 10 Pa. The molecular weight is preferably in the range of 120 or about 120 to 800 or about 800, and the vapor pressure at 20° C. is preferably in the range of 0.0001 Pa or about 0.0001 Pa to 5 Pa or about 5 Pa. The upper limit of the amount of the hydroxyl groups in the molecule is not particularly limited, but when the amount is too much, nozzle clogging may be caused. Therefore, the upper limit of the amount of the hydroxyl groups in the molecule is preferably 20 or less, and more preferably 12 or less.

The compound having four or more hydroxyl groups in the molecule is particularly preferably one or more compounds selected from the group consisting of disaccharides, monosaccharides, derivatives of monosaccharides, derivatives of disaccharides, modified compounds of disaccharides and modified compounds of monosaccharides.

Examples of the disaccharides include maltose, lactose, nigerose, trehalose, cellobiose, sucrose, and sophorose.

Examples of the monosaccharides include ribose, xylose, arabinose, glucose, mannose, galactose, lyxose, fructose, arabinose, aldohexose, allose, talose, gulose, altrose, and idose.

Examples of the derivatives and modified compounds of monosaccharides or disaccharides include erythritol, xylitol, mannitol, arabitol, ribitol, sorbitol, maltitol, lactitol, pentaerythritol, inositol, deoxyribose, fucose, rhamnose, glucuronic acid, glucosamine, and ascorbic acid.

—Other Additives—

The ink used in the embodiments of the invention may include, in addition to the above-described components, other various additives as necessary. For example, alkali metal compounds such as potassium hydroxide, sodium hydroxide and lithium hydroxide, and nitrogen-containing compounds such as ammonium hydroxide, ethanolamine and 2-amino-2-methyl-1-propanol may be added for adjusting electric conductivity or pH of the ink.

Additives such as an antioxidant, a fungicide, a viscosity adjusting agent, a conductive agent, and an ultraviolet absorbing agent may also be added according to usage.

—Physical Properties of the Ink—

In the following, preferable physical properties of the ink according to the embodiments of the invention will be discussed.

The surface tension of the ink is preferably in the range of from 20 mN/m to 60 mN/m, and more preferably from 20 mN to 45 mN/m.

When the surface tension of the ink is less than 20 mN/m, the liquid may spill over onto the surface of the nozzle of the recording head to hinder normal operation of image formation. On the other hand, when the surface tension of the ink is more than 60 mN/m, permeation speed into a recording medium may slow down to increase the time for drying.

The viscosity of the ink is preferably in the range of from 1.2 mPa·s to 8.0 mPa·s, and more preferably from 1.5 mPa·s to 6.0 mPa·s.

When the viscosity of the ink is more than 8.0 mPa·s, the ejection property may deteriorate, and when the viscosity of the ink is less than 1.2 mPa·s, the long-term injection property may deteriorate.

<Ink Set>

The ink set used in the embodiments of the invention contains at least the ink used in the embodiments of the invention, and a liquid containing a coagulant and substantially no colorant (hereinafter may be referred to as "processing liquid").

The ink set is preferably composed of inks of two or more types (colors). For example, the ink set may be composed of inks of four colors, i.e., black, cyan, magenta and yellow.

—Processing Liquid—

The processing liquid contains substantially no colorant (the colorant here refers to a material used mainly for coloring, such as known pigments and dyes), and contains a component for coagulating the pigment in the ink (coagulant). The processing liquid may further contain a solvent such as water, and other components as necessary. The processing liquid is preferably substantially colorless and transparent, but may also be slightly colored such that the region on a recording medium surface where the processing liquid has been applied before or after the application of the ink. The expression "slightly colored" here refers to a condition where coloring of the processing liquid is not intended for imparting color to the processing liquid as a main purpose.

The coagulant may be, for example, an inorganic electrolyte, an organic amine compound or an organic acid compound. The inorganic electrolyte may be, for example, a salt of an alkali metal or polyvalent metal.

Examples of the inorganic electrolyte include salts of an alkali metal ion such as a lithium ion, a sodium ion and a potassium ion, or a polyvalent metal ion such as an aluminum ion, a barium ion, a calcium ion, a copper ion, an iron ion, a magnesium ion, a manganese ion, a nickel ion, a tin ion, a titanium ion and a zinc ion, and hydrochloric acid, hydrobromic acid, hydroiodic acid, sulfuric acid, nitric acid, phosphoric acid, thiocyan acid.

Specific examples thereof include salts of alkali metals such as lithium chloride, sodium chloride, potassium chloride, sodium bromide, potassium bromide, sodium iodide, potassium iodide, sodium sulfate, potassium nitrate, and salts of polyvalent metals such as aluminum chloride, aluminum bromide, aluminum sulfate, aluminum nitrate, aluminum sodium sulfate, aluminum potassium sulfate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, copper chloride, copper bromide, copper sulfate, copper nitrate, iron chloride, iron bromide, iron iodide, iron sulfate, iron nitrate, magnesium chloride, magnesium bromide, magnesium iodide, magnesium sulfate, magnesium nitrate, manganese chloride, manganese sulfate, manganese nitrate, manganese dihydrogen phosphate, nickel chloride, nickel bromide, nickel sulfate, nickel nitrate, tin sulfate, titanium chloride, zinc chloride, zinc bromide, zinc sulfate, zinc nitrate, and zinc thiocyanate.

Examples of the organic amine compounds include primary, secondary, tertiary, and quaternary amines and salts thereof. Specific examples thereof include tetraalkylammonium salts, alkylamine salts, benzalkonium salts, alkylpyridinium salts, imidazolium salts, and polyamines such as isopropylamine, isobutylamine, t-butylamine, 2-ethylhexylamine, nonylamine, dipropylamine, diethylamine, trimethylamine, triethylamine, dimethylpropylamine, ethylenediamine, propylenediamine, hexamethylenediamine, diethylenetriamine, tetraethylenepentamine, diethanolamine, diethylethanolamine, triethanolamine, tetramethylammonium chloride, tetraethylammonium bromide, dihydroxyethylstearylamine, 2-heptadecenyl-hydroxyethylimidazoline, lauryldimethylbenzylammonium chloride, cetylpyridinium chloride, stearamidemethylpyridinium chloride, diallyldimethylammonium chloride polymers, diallylamine polymers, monoallylamine polymers, and onium salts such as sulfonium salts or phosphonium salts, and phosphates of these compounds.

Examples of the organic acids include pyrrolidonecarboxylic acids such as 2-pyrrolidone-5-carboxylic acid and 4-methyl-4-pentanolide-3-carboxylic acid, furancarboxylic acids such as 2-benzofurancarboxylic acid, 5-methyl-2-furancarboxyl acid, 2,5-dimethyl-3-furancarboxylic acid and 2,5-furandicarboxylic acid, 4-butanolide-3-carboxylic acid, pyronecarboxylic acids such as 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid and 3-hydroxy-4-pyrone-2,6-dicarboxylic acid, thiophenecarboxylic acid, pyrrolecarboxylic acids such as 2-pyrrolecarboxylic acid and 2,3-dimethylpyrrole-4-carboxylic acid, 2,4,5-trimethylpyrrole-3-propionic acid, 3-hydroxy-2-indolecarboxylic acid, 2,5-dioxo-4-methyl-3-pyrroline-3-propionic acid, 2-pyrrolidinecarboxylic acid, 4-hydroxyproline, 1-methylpyrrolidine-2-carboxylic acid, 5-carboxy-1-methylpyrrolidine-2-acetic acid, pyridinecarboxylic acids such as 2-pyridinecarboxylic acid, 3-pyridinecarboxylic acid and 4-pyridinecarboxylic acid, pyridinedicarboxylic acid, pyridinetricarboxylic acid, pyridinepentacarboxylic acid, nicotinic acids such as 1,2,5,6-tetrahydro-1-methylnicotinic acid, 2-quinolinecarboxylic acid, 4-quinolinecarboxylic acid, 2-phenyl-4-quinolinecarboxylic acid, 4-hydroxy-2-quinolinecarboxylic acid, 6-methoxy-4-quinolinecarboxylic acid, phthalic acid, citric acid, succinic acid, tartaric acid, lactic acid, and derivatives or salts of these compounds, the aforementioned styrene-styrene sulfonate copolymer, styrene-maleic acid copolymer, styrene-methacrylic acid copolymer, styrene-acrylic acid copolymer, vinyl naphthalene-maleic acid copolymer, vinyl naphthalene-methacrylic acid copolymer, vinyl naphthalene-acrylic acid copolymer, alkyl acrylate-acrylic acid copolymer, alkyl methacrylate-methacrylic acid copolymer, styrene-alkyl methacrylate-methacrylic acid copolymer, styrene-alkyl acrylate-acrylic acid copolymer, styrene-phenyl methacrylate-methacrylic acid copolymer, and styrene-cyclohexyl methacrylate-methacrylic acid copolymer.

Among the above, preferable examples are pyrrolidone carboxylic acid, pyronecarboxylic acid, pyrrolecarboxylic acid, furancarboxylic acid, pyridinecarboxylic acid, coumaric acid, thiophenecarboxylic acid, nicotinic acid, potassium dihydrogen citrate, succinic acid, tartaric acid, lactic acid, potassium hydrogen phthalate, and derivatives or salts of these compounds, and more preferable ones are pyrrolidonecarboxylic acid, pyronecarboxylic acid, furancarboxylic acid, coumaric acid, and derivatives or salts of these compounds.

The coagulant in the processing liquid may be used alone or in combination of two or more. The amount of the coagulant in the processing liquid is preferably from 0.01% or about 0.01% by weight to 30% or about 30% by weight, more preferably from 0.1% or about 0.1% by weight to 15% or about 15% by weight, and further preferably from 0.25% or about 0.25% by weight to 10% or about 10% by weight.

When the amount of the coagulant in the processing liquid is less than 0.01% or about 0.01% by weight, the pigment may not sufficiently coagulate at a time when the ink and processing liquid are brought into contact and mixed with each other on the recording medium, thereby causing deterioration of image density, bleeding, and inter-color bleeding. On the other hand, when the amount is more than 30% or about 30% by weight, the injection property of the ink may be inferior and hinder normal injection of the liquid.

The processing liquid preferably contains a compound having four or more hydroxyl groups in the molecule, for the purpose of preventing curling of a recording medium. However, as is the case with the ink, the compound having four or more hydroxyl groups in the molecule may cause nozzle clogging due to precipitation. Therefore, the compound having four or more hydroxyl groups in the molecule is preferably used in combination with a compound having two hydroxyl groups in the molecule and a compound having three hydroxyl groups in the molecule. The compounds having two, three, or four or more hydroxyl groups in the molecule contained in the processing liquid may be the same ones as those contained in the ink used in the embodiments of the invention.

The content of the compound having four or more hydroxyl groups in the molecule in the processing liquid is preferably in the range of from 28% or about 28% by weight to 45% or about 45% by weight, and more preferably in the range of from 30% or about 30% by weight to 40% or about 40% by weight or less.

When the content of the compound having four or more hydroxyl groups in the molecule is less than 28% or about 28% by weight, curling may occur. On the other hand, when the content of the compound having four or more hydroxyl groups in the molecule is more than 45% or about 45% by weight, nozzle clogging may occur.

The content of the compound having two hydroxyl groups in the molecule in the processing liquid is preferably in the range of from 3% or about 3% by weight to 10% or about 10% by weight, and more preferably in the range of from 3% or about 3% by weight to 8% or about 8% by weight.

When the above content is less than 3% or about 3% by weight, nozzle clogging may occur when the ink ejection is carried out after the ink ejecting apparatus has been in a resting state for a long period of time. From the viewpoint of preventing nozzle clogging, the content of the compound having two hydroxyl groups in the molecule is preferably higher. However, if the content of the compound having two hydroxyl groups in the molecule is more than 10% or about 10% by weight, contents of other components may not be enough and it may be difficult to achieve both of clogging prevention and other properties.

The content of the compound having three hydroxyl groups in the molecule in the processing liquid is preferably in the range of from 3% or about 3% by weight to 18% or about 18% by weight, and more preferably in the range of from 5% or about 5% by weight to 15% or about 15% by weight.

When the above content is less than 3% or about 3% by weight, nozzle clogging may occur when ink ejection is performed with intermittent stoppages during image formation. From the viewpoint of suppressing nozzle clogging, the content of the compound having three hydroxyl groups in the molecule is preferably higher. However, if the content of the compound having three hydroxyl groups in the molecule is more than 18% or about 18% by weight, contents of other components in the processing liquid may not be enough and it may be difficult to achieve both of clogging prevention and other properties.

In addition, when both of the contents of the compound having two hydroxyl groups in the molecule and the compound having three hydroxyl groups in the molecule are less than 3% or about 3% by weight, the compound having four or more hydroxyl groups in the molecule may not be able to dissolve in the ink, and which may cause nozzle clogging.

Accordingly, in order to prevent nozzle clogging caused by precipitation of the compound having four or more hydroxyl groups in the molecule, the total content of the compound having two hydroxyl groups in the molecule and the compound having three hydroxyl groups in the molecule is preferably 6% or about 6% by weight or more, and more preferably 8% or about 8% by weight or more.

The solvent contained in the processing liquid may be the same one as that contained in the ink, and other components may be appropriately selected as with those included in the ink, thereby achieving intended physical properties and other properties such as viscosity and surface tension.

—Physical Properties of Processing Liquid—

Preferable physical properties of the processing liquid according to an embodiment of the invention will be described in the following.

The surface tension of the processing liquid is preferably in the range of from 20 or about 20 mN/m to 45 or about 45 mN/m, and more preferably in the range of from 20 or about 20 mN and 39 or about 39 mN/m. If the surface tension is less than 20 or about 20 mN/m, the liquid may spill over onto the surface of the nozzle of the recording head to hinder normal image formation. On the other hand, if the surface tension is more than 45 or about 45 mN/m, permeation speed may slow down, which may prolong the drying time.

The viscosity of the processing liquid is preferably in the range of from 1.2 or about 1.2 mPa·s to 8.0 or about 8.0 mPa·s, and more preferably in the range of from 1.5 or about 1.5 mPa·s to 6.0 or about 6.0 mPa·s. If the viscosity of the processing liquid is more than 8.0 or about 8.0 mPa·s, ejection properties may deteriorate, and if less than 1.2 or about 1.2 mPa·s, injection properties over the long term may deteriorate.

<Ink Cartridge>

The ink cartridge used in the embodiments of the invention includes a container accommodating at least the ink used in the embodiments of the invention, and can be detachably attached to the ink ejecting apparatus. In cases where two or more types of inks are used, each ink may be contained in each container, respectively. In cases where a processing liquid is used, a container may for accommodating the processing liquid may also be provided.

Further, the ink cartridge used in the embodiments of the invention may include other members appropriately selected as necessary. Specifically, the ink cartridge may include such members as one having a recording head, other than the containers for accommodating inks, and suffices as the ink cartridge used in the embodiments of the invention as long as it is removable from the ink ejection apparatus to be replaced with a new one.

The container is not particularly limited and the shape, structure, size, material and the like thereof may be selected according to the intended use. Preferable examples of the containers include one having at least an ink bag of an aluminum laminate film, a resin film or the like. The container may be, for example, those described in Japanese Patent Application Laid-Open (JP-A) No. 2001-138541 and others.

<Ink Ejecting Apparatus>

The ink ejecting apparatus used in the embodiments of the invention includes the ink cartridge for accommodating the ink or ink set used in the embodiments of the invention, and a liquid ejecting unit for ejecting the liquid onto a recording medium.

The apparatus may be, not to mention a commonly used ink ejecting apparatus, a recording apparatus including a heater for controlling drying of ink, or a recording apparatus including an intermediate transfer mechanism wherein a recording material is first printed onto an intermediate, and then transferred onto a recording medium such as paper. The ink ejecting apparatus used in the embodiments of the invention may employ a thermal ink jet recording system, or a piezo ink jet recording system.

In cases where an ink set composed of an ink and a processing liquid is used, in the ink ejecting apparatus used in the embodiments of the invention, the ratio of the application amounts of the ink and the processing liquid necessary to form one pixel is preferably 1:20 to 20:1, more preferably 1:10 to 10:1, and further preferably 1:5 to 5:1, by weight ratio.

When the application amount of the ink is too much with respect to the application amount of the processing liquid, the ink may not sufficiently coagulate, and deteriorations in optical density, bleeding, and inter-color bleeding may be caused. On the other hand, when the application amount of the processing liquid is too much with respect to the application amount of the ink, such an excessive amount of the liquid deposits may result in deteriorations in drying time and curling. A pixel here refers to a lattice point formed by dividing an intended image into minimum printable distances in a fast scanning direction and a slow scanning direction. By applying appropriate inks in an ink set onto respective pixels, colors and image density can be adjusted to form an image.

In cases where recording is carried out using a processing liquid, the ink and the processing liquid may be applied onto a recording medium so as to be in contact with each other. When the ink and the processing liquid are in contact with each other, the ink can coagulate by the effect of the coagulant, which may result in improvements in color development properties, solid image unevenness, optical density, bleeding, inter-color bleeding, and drying properties. As long as the ink and the processing liquid are in contact with each other, they may be applied in a manner to be adjacent to each other, or in a manner that one overlays the other.

Either the processing liquid or the ink may be applied onto a recording medium prior to the application of the other.

However, it is preferable that the processing liquid is applied before the application of the ink. By applying the processing liquid first, coagulation of the ink components may be effectively achieved. In this case, the timing of applying the ink is not limited as long as it is carried out after the application of the processing liquid. Preferably, the ink is applied within 0.5 second after the processing liquid has been applied.

In the ink ejecting apparatus used in the embodiments of the invention, the masses per drop of both of the ink and the processing liquid are preferably in the range of from 0.01 ng to 25 ng, more preferably in the range of from 0.5 ng to 20 ng, and further preferably in the range of from 0.5 ng to 15 ng. When the mass per drop of the ink or the processing liquid is more than 25 ng, the amount of ink adhering to the nozzle face may increase and redispersion thereof may become difficult, as well as worsening bleeding. When the mass per drop of the ink or the processing liquid is less than 0.01 ng, ejection stability may deteriorate.

The amount of one droplet here refers to the minimum amount of a droplet that can be printed by an ink jet recording apparatus capable of ejecting droplets with varying volumes from a single nozzle.

In the following, preferable exemplary embodiments of the ink ejecting apparatus of the invention will be illustrated by referring to the drawings. In the figures, members having equivalent functions are denoted by the same reference numerals, and the overlapping explanations are omitted.

Figure 2:
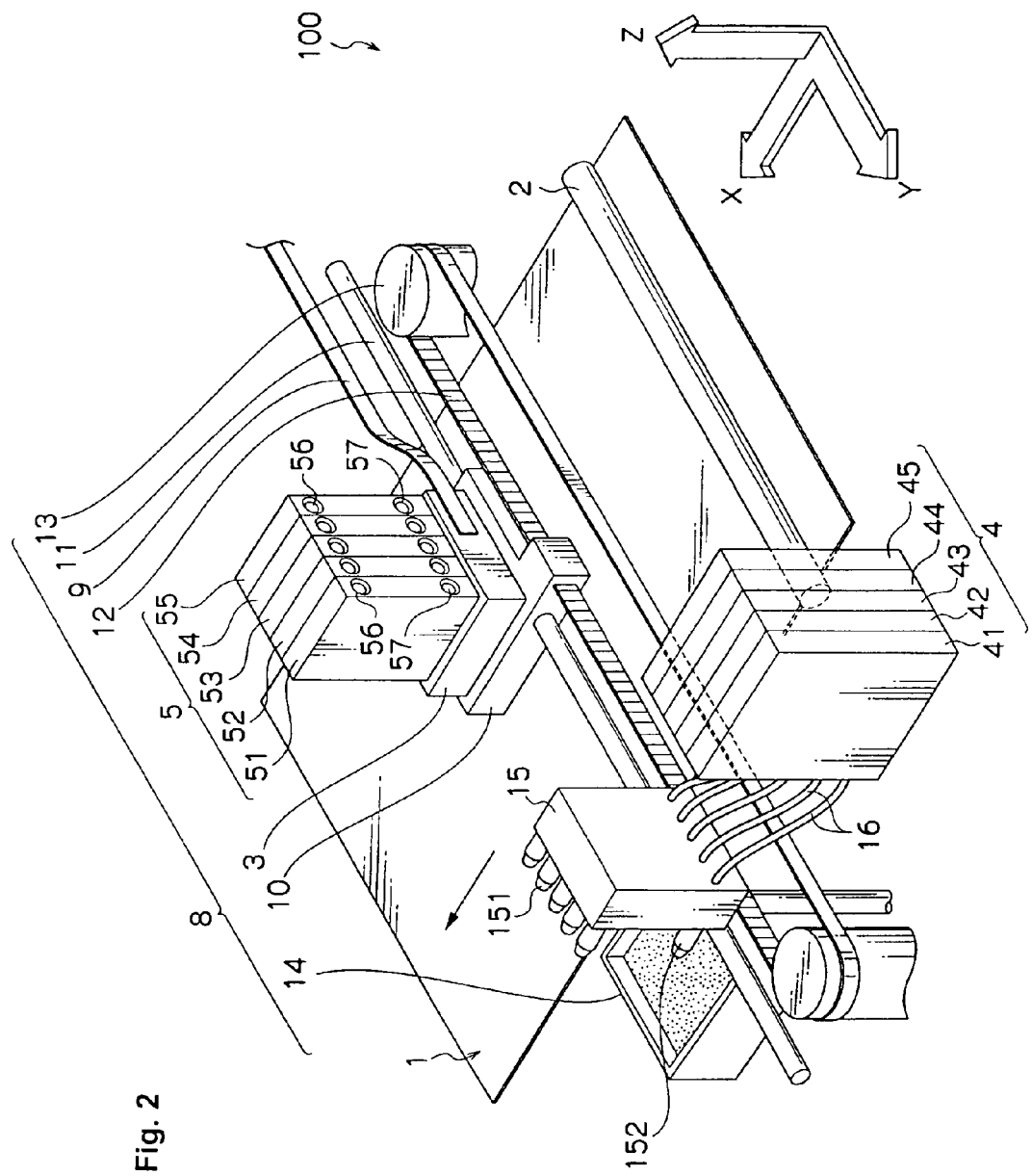
FIG. 2 is a perspective view of a basic internal structure of the recording apparatus of FIG. 1.

FIG. 1 is a perspective view showing the external structure of a preferable exemplary embodiment of the ink ejecting apparatus of the invention (ink jet recording apparatus). FIG. 2 is a perspective view showing the internal basic structure of the recording apparatus of FIG. 1 (hereinafter referred to as "image forming apparatus"). An image forming apparatus 100 according to the embodiment is configured so as to operate based on an ink jet recording system, thereby forming an image. More specifically, as shown in FIGS. 1 and 2, the image forming apparatus 100 is composed mainly of an outer cover 6, a sheet feeding unit 7 capable of accommodating a predetermined amount of recording mediums 1 such as plain paper sheets, a conveyor roller 2 for conveying the recording medium 1 to the inside of the image forming apparatus 100 in a one-by-one manner, an image forming unit 8 for ejecting an ink and a processing liquid onto the surface of the recording medium 1 to form an image, and a main ink tank 4 for feeding the inks and the processing liquid to respective subsidiary ink tanks 5.

The conveyor roller 2 has a paper feeding structure composed of a pair of rollers that are rotatably provided in image forming apparatus 100, and the rollers nip a recording medium 1 set in sheet feeding unit 7 to convey into image forming apparatus 100 at a predetermined timing.

Image forming unit 8 forms an image with ink onto the surface of recording medium 1. Image forming unit 8 includes, as main components, a recording head 3, a subsidiary ink tank 5, a power feeding signal cable 9, a conveyor 10, a guide rod 11, a timing belt 12, a pair of driving pulleys 13, and a maintenance unit 14.

Subsidiary ink tank 5 include a set of ink tank units 51, 52, 53, 54 and 55 in which different colors of inks and/or a processing liquid are respectively contained. These ink tanks units contain, for example, inks for ink jet recording of black (K), yellow (Y), magenta (M), cyan (C), and a processing liquid. In a case where a processing liquid is not used, or a case where a processing liquid contains a colorant, the ink tank for the processing liquid may not have to be provided.

Each of ink tank units 51 to 55 has an exhausting hole 56 and a supplying hole 57. When recording head 3 moves to a waiting position (or a supply position), an exhausting pin 151 and a supplying pin 152 are inserted into exhausting hole 56 and supplying hole 57, respectively, so that subsidiary ink tank 5 and a supplying unit 15 can be in communication with each other. Further, supplying unit 15 is connected to main ink tank 4 via a supplying duct 16, and inks and/or a processing liquid are supplied into subsidiary ink tank units 5 from main ink tank 4, through supplying holes 57.

In this embodiment, main ink tank 4 also includes a set of main ink tank units 41, 42, 43, 44 and 45 each containing different colors of inks and a processing liquid. These ink tanks contain, for example, inks for ink jet recording of black (K), yellow (Y), magenta (M), cyan (C) as "first liquids", and a processing liquid as a "second liquid", and are detachably accommodated in image forming apparatus 100.

Further, as shown in FIG. 2, power feeding signal cable 9 and subsidiary ink tank 5 are connected to recording head 3, and when an external image recording information is input to recording head 3 via power feeding signal cable 9, recording head 3 sucks a predetermined amount of ink from respective ink tank units and ejects the ink onto the surface of a recording medium, according to the image forming information. Power feeding signal cable 9 also supplies electric power to drive recording head 3, as well as the image forming information.

Recording head 3 is mounted and fixed on conveyor 10, and guide rod 11 and timing belt 12 trained on driving pulleys 13 are connected to conveyor 10. In this structure, recording head 3 can also move, along guide rod 11, in a direction Y (fast scanning direction) that is parallel to the surface of recording medium 1 and is perpendicular to a direction X (slow scanning direction) in which recording medium 1 is conveyed.

Image forming apparatus 100 is equipped with a control unit (not shown) that regulates the timings of driving recording head 3 and conveyor 10, according to image recording information.

Maintenance unit 14 is connected to a decompression unit (not shown) via a tube. This decompression unit is also connected to a nozzle part of recording head 3 and performs suction of ink from the nozzle of recording head 3 by reducing the pressure in the nozzle.

Figure 3:
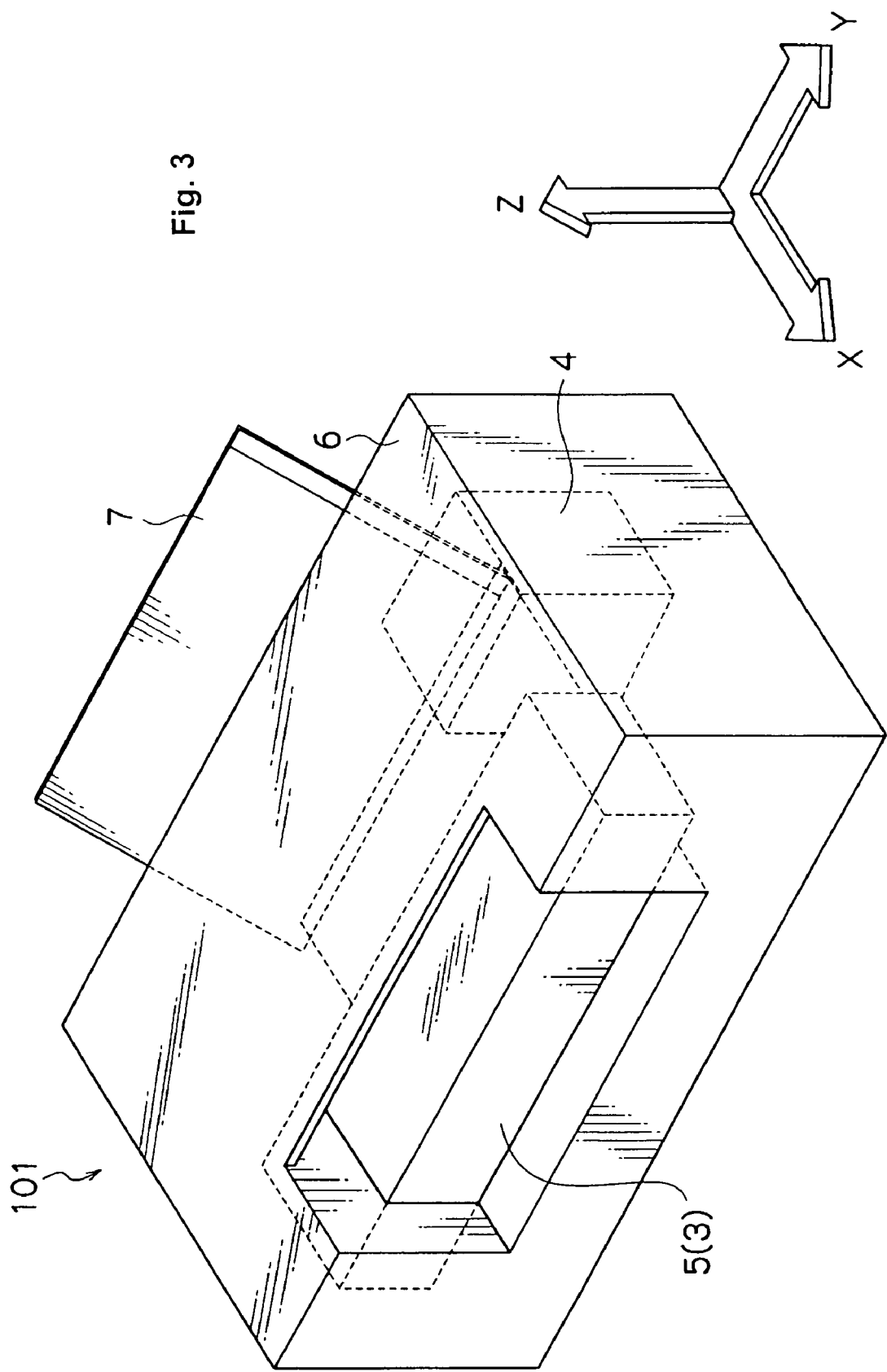
FIG. 3 is a perspective view of an appearance of another exemplary embodiment of the recording apparatus of the invention.
Figure 4:
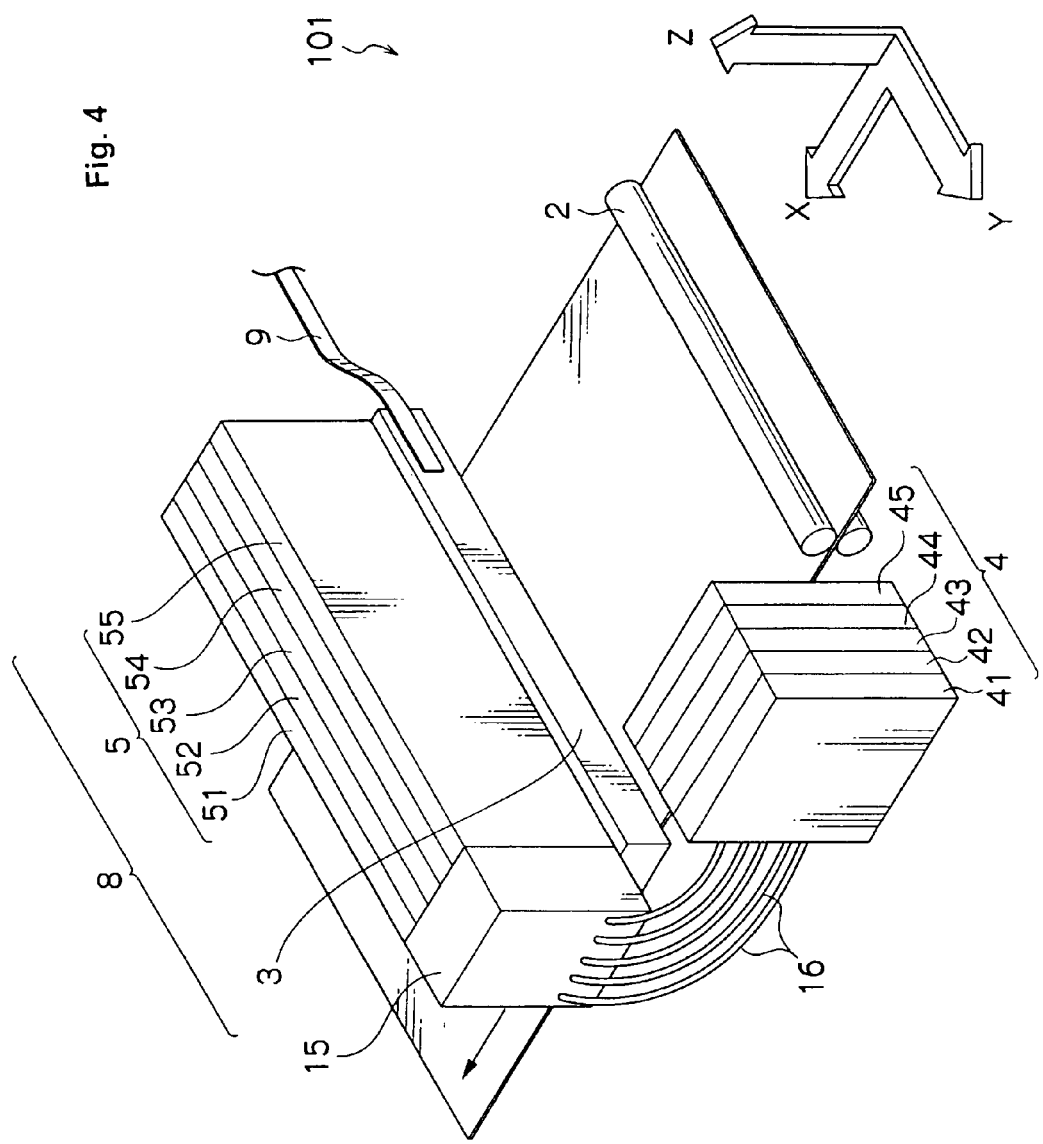
FIG. 4 is a perspective view of a basic internal structure of the recording apparatus of FIG. 3.

FIG. 3 is a perspective view of another preferable exemplary embodiment of the ink ejecting apparatus according to the invention (hereinafter, referred to as an image forming apparatus), and FIG. 4 is a perspective view of internal basic structure of the ink ejecting apparatus shown in FIG. 3. An image forming apparatus 101 of this embodiment has a structure in which images are formed by an ink jet method.

Image forming apparatus 101 shown in FIGS. 3 and 4 includes recording head 3 having a width that is equal to or larger than the width of recording medium 1, and employs a sheet feeding system in a slow scanning direction (direction X in which recording medium 1 is conveyed), instead of a conveying system. In this embodiment, sheet feeding is performed by conveyor roller 2, but is also performed by a belt, for example.

Further, although not indicated in the drawings, a set of nozzles that eject inks of respective colors (including a processing liquid) are also arranged in a slow scanning direction (direction X in which recording medium 1 is conveyed), in accordance with ink tank units 51 to 55 arranged in a slow scanning direction. Other features of the structures than the above will not be explained here, since they correspond to those in the case of FIGS. 1 and 2.

Image forming apparatus 101 illustrated in FIGS. 3 and 4 can perform printing in a width direction of recording medium 1 (fast scanning direction), all by recording head 3.

As the recording medium used in the embodiments of the invention, permeable paper containing pulp fibers and having a structure in which a liquid can permeate into the insider thereof from the surface, such as plain paper can be used. However, if necessary, non-permeable media such as art paper, films and metals can also be utilized.

EXAMPLES

In the following, the invention will be explained in further details by referring to the examples, but the invention is not limited thereto.

<Preparation of the Pigment Dispersion>
—Preparation of Pigment Dispersion A—

| | |
|---|---|
| Pigment (Pigment Blue 15:3) | 40% by weight |
| Dispersant (a resin obtained by neutralizing styrene-methacrylic acid-hydroxy alkoxy alkyl methacrylate copolymer with NaOH, weight average molecular weight; 15,000, acid value; 220) | 4% by weight |
| Water | balance |

Pigment dispersion A is obtained by mixing and stirring the above components, and then filtering with a 5-μm mesh filter.

—Preparation of Pigment Dispersion B—

| | |
|---|---|
| Pigment (Pigment Blue 15:3) | 25% by weight |
| Dispersant (a resin obtained by neutralizing styrene-methacrylic acid-2-ethylhexyl methacrylate copolymer with NaOH, weight average molecular weight; 12,000, acid value; 190) | 4% by weight |
| Water | balance |

Pigment dispersion B is obtained by mixing and stirring the above components, and then filtering with a 5-μm mesh filter.

—Preparation of Pigment Dispersion C—

| | |
|---|---|
| Pigment (Pigment Blue 15:3) | 50% by weight |
| Dispersant (a resin obtained by neutralizing styrene-methacrylic acid-butyl methacrylate copolymer with NaOH, weight average molecular weight; 12,000, acid value; 190) | 4% by weight |
| Water | balance |

Pigment dispersion C is obtained by mixing and stirring the above components, and then filtering with a 5-μm mesh filter.

—Preparation of Pigment Dispersion D—

| | |
|---|---|
| Pigment (Carbon Black) | 40% by weight |
| Dispersant (a resin obtained by neutralizing styrene-methacrylic acid-ethyl acrylate copolymer with NaOH, weight average molecular weight; 12,000, acid value; 190) | 4% by weight |
| Water | balance |

Pigment dispersion D is obtained by mixing and stirring the above components, and then filtering with a 5-μm mesh filter.

<Preparation of the Ink>
—Preparation of Ink A1—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A1.

—Preparation of Ink A2—

| | |
|---|---|
| Pigment dispersion A (solid content of pigment in the dispersion; 10% by weight) | 25% by weight |
| Tetraethylene glycol | 1.0% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A2.

—Preparation of Ink A3—

| | |
|---|---|
| Pigment dispersion A (solid content of pigment in the dispersion; 10% by weight) | 25% by weight |
| Tetraethylene glycol | 9.5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A3.

—Preparation of Ink A4—

| | |
|---|---|
| Pigment dispersion A (solid content of pigment in the dispersion; 10% by weight) | 25% by weight |
| Tetraethylene glycol | 5% by weight |
| Glycerol | 2.5% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A4.

—Preparation of Ink A5—

| | |
|---|---|
| Pigment dispersion A (solid content of pigment in the dispersion; 10% by weight) | 25% by weight |
| Tetraethylene glycol | 5% by weight |
| Glycerol | 20% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A5.

—Preparation of Ink A5—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 25% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A6.

—Preparation of Ink A7—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 29% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A7.

—Preparation of Ink A8—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 42% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A8.

—Preparation of Ink A9—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 50% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A9.

—Preparation of Ink A10—

| | |
|---|---|
| Pigment dispersion A (solid content of pigment in the dispersion; 7.2% by weight) | 18% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A10.

—Preparation of Ink A11—

| | |
|---|---|
| Pigment dispersion A (solid content of pigment in the dispersion; 8% by weight) | 20% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A11.

—Preparation of Ink A12—

| | |
|---|---|
| Pigment dispersion C (solid content of pigment in the dispersion; 20% by weight) | 40% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A12.

—Preparation of Ink A13—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.2% by weight |
| Surfactant (SURFYNOL 485, manufactured by Nissin Chemical Industry Co., Ltd.) | 0.5% by weight |
| Triethylene glycol monobutyl ether | 3% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A13.

—Preparation of Ink A14—

| | |
|---|---|
| Pigment dispersion A (solid content of pigment in the dispersion; 16.8% by weight) | 42% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethylene glycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink A14.

—Preparation of Ink B1—

| | |
|---|---|
| Pigment dispersion A (solid content of pigment in the dispersion; 12% by weight) | 30% by weight |
| Diethylene glycol | 6% by weight |
| Glycerol | 12% by weight |
| Xylitol | 40% by weight |
| Surfactant (SURFYNOL 465, manufactured by Nissin Chemical Industry Co., Ltd.) | 1.5% by weight |

A pH adjuster (2N: LiOH) and pure water are added to the above components so that the total weight of the mixture is 100% by weight. The liquid (pH=8.2) obtained by stirring the mixture is filtered with a 5-μm mesh filter to prepare ink B1.

—Preparation of Ink B2—

| | |
|---|---|
| Pigment dispersion B (solid content of pigment in the dispersion; 10% by weight) | 40% by weight |
| 1,2-butanediol | 4% by weight |
| Trimethylol propane | 7% by weight |
| Mannose | 30% by weight |
| Surfactant (oxyethylene oleic ether) | 1.0% by weight |
| Diethyleneglycol monobutyl ether | 5% by weight |

A pH adjuster (2N: LiOH) and pure water are added to the above components so that the total weight of the mixture is 100% by weight. The liquid (pH=8.8) obtained by stirring the mixture is filtered with a 5-μm mesh filter to prepare ink B2.

—Preparation of Ink B3—

| | |
|---|---|
| Pigment dispersion B (solid content of pigment in the dispersion; 10% by weight) | 40% by weight |
| 1,2-hexanediol | 3% by weight |
| Oxyethylene adduct of glycerol | 12% by weight |
| Trehalose | 32% by weight |
| Surfactant (oxyethylene-oxypropylene block copolymer) | 1.0% by weight |
| Dipropyleneglycol monopropyl ether | 4% by weight |

A pH adjuster (2N: LiOH) and pure water are added to the above components so that the total weight of the mixture is 100% by weight. The liquid (pH=8.8) obtained by stirring the mixture is filtered with a 5-μm mesh filter to prepare ink B3.

—Preparation of Ink B4—

| | |
|---|---|
| Pigment dispersion B (solid content of pigment in the dispersion; 10% by weight) | 40% by weight |
| Ethyleneglycol | 7% by weight |
| Glycerol | 15% by weight |
| Xylose | 35% by weight |
| Surfactant (SURFYNOL 465, manufactured by Nissin Chemical Industry Co., Ltd.) | 1.5% by weight |
| Triethyleneglycol monohexyl ether | 3% by weight |

A pH adjuster (2N: LiOH) and pure water are added to the above components so that the total weight of the mixture is 100% by weight. The liquid (pH=8.7) obtained by stirring the mixture is filtered with a 5-μm mesh filter to prepare ink B4.

—Preparation of Ink B5—

| | |
|---|---|
| Pigment dispersion D (solid content of pigment in the dispersion; 8% by weight) | 20% by weight |
| Diethyleneglycol | 6% by weight |
| Glycerol | 12% by weight |
| Fructose | 33% by weight |
| Surfactant (SURFYNOL 465, manufactured by Nissin Chemical Industry Co., Ltd.) | 0.8% by weight |
| Triethyleneglycol monobutyl ether | 4% by weight |

A pH adjuster (2N: LiOH) and pure water are added to the above components so that the total weight of the mixture is 100% by weight. The liquid (pH=8.4) obtained by stirring the mixture is filtered with a 5-μm mesh filter to prepare ink B5.

—Preparation of Ink C1—

| | |
|---|---|
| Pigment dispersion A (solid content of pigment in the dispersion; 10% by weight) | 25% by weight |
| Tetraethylene glycol | 0.5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C1.

—Preparation of Ink C2—

| | |
|---|---|
| Pigment dispersion A (solid content of pigment in the dispersion; 10% by weight) | 25% by weight |
| Tetraethylene glycol | 15% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C2.

—Preparation of Ink C3—

| | |
|---|---|
| Pigment dispersion A (solid content of pigment in the dispersion; 10% by weight) | 25% by weight |
| Tetraethylene glycol | 5% by weight |
| Glycerol | 1% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C3.

—Preparation of Ink C4—

| | |
|---|---|
| Pigment dispersion A (solid content of pigment in the dispersion; 10% by weight) | 25% by weight |
| Tetraethylene glycol | 5% by weight |
| Glycerol | 25% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C4.

—Preparation of Ink C5—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 20% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C5.

—Preparation of Ink C6—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Glucose | 52% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C6.

—Preparation of Ink C7—

| | |
|---|---|
| Pigment dispersion A (solid content of pigment in the dispersion; 10% by weight) | 25% by weight |
| Tetraethylene glycol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C7.

—Preparation of Ink C8—

| | |
|---|---|
| Pigment dispersion A (solid content of pigment in the dispersion; 10% by weight) | 25% by weight |
| Glycerol | 17% by weight |
| Glucose | 35% by weight |

-continued

| | |
|---|---|
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C8.

—Preparation of Ink C9—

| | |
|---|---|
| Pigment dispersion A (solid content of pigment in the dispersion; 10% by weight) | 25% by weight |
| Tetraethylene glycol | 5% by weight |
| Glycerol | 10% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C9.

—Preparation of Ink C10—

| | |
|---|---|
| Pigment dispersion A (solid content of pigment in the dispersion; 10% by weight) | 25% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C10.

—Preparation of Ink C11—

| | |
|---|---|
| Pigment dispersion A (solid content of pigment in the dispersion; 4.8% by weight) | 12% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C11.

—Preparation of Ink C12—

| | |
|---|---|
| Pigment dispersion C (solid content of pigment in the dispersion; 21% by weight) | 42% by weight |
| Tetraethylene glycol | 5% by weight |
| Glycerol | 10% by weight |
| Glucose | 35% by weight |
| Surfactant (SURFYNOL 440, manufactured by Nissin Chemical Industry Co., Ltd.) | 0.5% by weight |
| Surfactant (SURFYNOL 485, manufactured by Nissin Chemical Industry Co., Ltd.) | 1.5% by weight |
| Triethyleneglycol monobutyl ether | 5% by weight |

A pH adjuster (2N: LiOH) and pure water are added to the above components so that the total weight of the mixture is 100% by weight. The liquid (pH=8.5) obtained by stirring the mixture is filtered with a 5-μm mesh filter to prepare ink C12. The types and contents of the main components of the above inks are shown in Tables 1 to 3.

TABLE 1

| Ink | Pigment Type of dispersion | Pigment Solid content of pigment in dispersion (% by weight) | Compound having two hydroxy groups in the molecule Type | Compound having two hydroxy groups in the molecule Content (% by weight) | Compound having three hydroxy groups in the molecule Type | Compound having three hydroxy groups in the molecule Content (% by weight) | Compound having four or more hydroxy groups in the molecule Type | Compound having four or more hydroxy groups in the molecule Content (% by weight) | Penetrating agent (% by weight) |
|---|---|---|---|---|---|---|---|---|---|
| A1 | A | 10 | Tetraethylene glycol | 5 | Glycerol | 10 | Glucose | 35 | 7 |
| A2 | A | 10 | Tetraethylene glycol | 1 | Glycerol | 10 | Glucose | 35 | 7 |
| A3 | A | 10 | Tetraethylene glycol | 9.5 | Glycerol | 10 | Glucose | 35 | 7 |
| A4 | A | 10 | Tetraethylene glycol | 5 | Glycerol | 2.5 | Glucose | 35 | 7 |
| A5 | A | 10 | Tetraethylene glycol | 5 | Glycerol | 20 | Glucose | 35 | 7 |
| A6 | A | 10 | Tetraethylene glycol | 5 | Glycerol | 10 | Glucose | 25 | 7 |
| A7 | A | 10 | Tetraethylene glycol | 5 | Glycerol | 10 | Glucose | 29 | 7 |
| A8 | A | 10 | Tetraethylene glycol | 5 | Glycerol | 10 | Glucose | 42 | 7 |
| A9 | A | 10 | Tetraethylene glycol | 5 | Glycerol | 10 | Glucose | 50 | 7 |
| A10 | A | 7.2 | Tetraethylene glycol | 5 | Glycerol | 10 | Glucose | 35 | 7 |
| A11 | A | 8 | Tetraethylene glycol | 5 | Glycerol | 10 | Glucose | 35 | 7 |
| A12 | C | 20 | Tetraethylene glycol | 5 | Glycerol | 10 | Glucose | 35 | 7 |
| A13 | A | 10 | Tetraethylene glycol | 5 | Glycerol | 10 | Glucose | 35 | 3.7 |
| A14 | A | 16.8 | Tetraethylene glycol | 5 | Glycerol | 10 | Glucose | 35 | 7 |

TABLE 2

| Ink | Pigment Type of dispersion | Pigment Solid content of pigment in dispersion (% by weight) | Compound having two hydroxy groups in the molecule Type | Compound having two hydroxy groups in the molecule Content (% by weight) | Compound having three hydroxy groups in the molecule Type | Compound having three hydroxy groups in the molecule Content (% by weight) | Compound having four or more hydroxy groups in the molecule Type | Compound having four or more hydroxy groups in the molecule Content (% by weight) | Penetrating agent (% by weight) |
|---|---|---|---|---|---|---|---|---|---|
| B1 | A | 12 | Diethylene glycol | 6 | Glycerol | 12 | Xylitol | 40 | 1.5 |
| B2 | B | 10 | 1,2-butanediol | 4 | Trimethylol propane | 7 | Mannose | 30 | 6 |
| B3 | B | 10 | 1,2-hexanediol | 3 | Oxyethylene adduct of glycerol | 12 | Trehalose | 32 | 5 |
| B4 | B | 10 | Ethylene glycol | 7 | Glycerol | 15 | Xylose | 35 | 4.5 |
| B5 | D | 8 | Diethylene glycol | 6 | Glycerol | 12 | Fructose | 33 | 4.8 |

TABLE 3

| Ink | Pigment Type of dispersion | Pigment Solid content of pigment in dispersion (% by weight) | Compound having two hydroxy groups in the molecule Type | Compound having two hydroxy groups in the molecule Content (% by weight) | Compound having three hydroxy groups in the molecule Type | Compound having three hydroxy groups in the molecule Content (% by weight) | Compound having four or more hydroxy groups in the molecule Type | Compound having four or more hydroxy groups in the molecule Content (% by weight) | Penetrating agent (% by weight) |
|---|---|---|---|---|---|---|---|---|---|
| C1 | A | 10 | Tetraethylene glycol | 0.5 | Glycerol | 10 | Glucose | 35 | 7 |
| C2 | A | 10 | Tetraethylene glycol | 15 | Glycerol | 10 | Glucose | 35 | 7 |
| C3 | A | 10 | Tetraethylene glycol | 5 | Glycerol | 1 | Glucose | 35 | 7 |
| C4 | A | 10 | Tetraethylene glycol | 5 | Glycerol | 25 | Glucose | 35 | 7 |
| C5 | A | 10 | Tetraethylene glycol | 5 | Glycerol | 10 | Glucose | 20 | 7 |
| C6 | A | 10 | Tetraethylene glycol | 5 | Glycerol | 10 | Glucose | 52 | 7 |
| C7 | A | 10 | Tetraethylene glycol | 10 | — | — | Glucose | 35 | 7 |
| C8 | A | 10 | — | — | Glycerol | 17 | Glucose | 35 | 7 |
| C9 | A | 10 | Tetraethylene glycol | 5 | Glycerol | 10 | — | — | 7 |
| C10 | A | 10 | — | — | — | — | Glucose | 35 | 7 |
| C11 | A | 4.8 | Tetraethylene glycol | 5 | Glycerol | 10 | Glucose | 35 | 7 |
| C12 | C | 21 | Tetraethylene glycol | 5 | Glycerol | 10 | Glucose | 35 | 7 |

<Preparation of the Processing Liquid>
—Preparation of Processing Liquid A—

| | |
|---|---|
| Citric acid | 10% by weight |
| Diethylene glycol | 5% by weight |
| Glycerol | 10% by weight |
| Glucose | 50% by weight |
| 1,2-butanediol | 5% by weight |
| Surfactant (OLFINE E1010, manufactured by Nissin Chemical Industry Co., Ltd.) | 1.0% by weight |

A pH adjuster (4N: NaOH) and pure water are added to the above components so that the total weight of the mixture is 100% by weight. The liquid (pH=about 4) obtained by stirring the mixture is filtered with a 0.22-μm mesh filter to prepare processing liquid A.

—Preparation of Processing Liquid B—

| | |
|---|---|
| Citric acid | 10% by weight |
| N-methyl-2-pyrrolidone | 20% by weight |
| Surfactant (OLFINE E1010, manufactured by Nissin Chemical Industry Co., Ltd.) | 1.0% by weight |

A pH adjuster (4N: NaOH) and pure water are added to the above components so that the total weight of the mixture is 100% by weight. The liquid (pH=about 4) obtained by stirring the mixture is filtered with a 0.22-μm mesh filter to prepare processing liquid A.

<Evaluation>

An ink ejecting apparatus capable of two-liquid printing equipped with a piezo-type prototype recording head having a resolution of 600 dpi (dpi: the number of dots per inch) is used for evaluation. The type of the inks used for image formation and evaluation results thereof are shown in Tables 4 to 6.

As shown in Table 7, in cases where a processing liquid is used together with an ink, the processing liquid is first applied prior to applying the ink. The ejected amounts of the processing liquid and ink per area are determined such that the ratio by weight of processing liquid:ink is 3:10.

TABLE 4

| | Ink | Image density | Nozzle clogging - After being left for a long time | Nozzle clogging - During image formation | Curling | Drying property | Dispersion stability |
|---|---|---|---|---|---|---|---|
| Example A1 | A1 | A | A | A | A | A | A |
| Example A2 | A2 | A | A | B | A | A | B |
| Example A3 | A3 | A | B | A | A | A | A |
| Example A4 | A4 | A | B | A | B | A | C |
| Example A5 | A5 | A | A | B | A | A | A |
| Example A6 | A6 | A | A | A | C | A | A |
| Example A7 | A7 | A | A | A | B | A | A |
| Example A8 | A8 | A | B | B | A | A | B |
| Example A9 | A9 | A | C | B | A | A | C |
| Example A10 | A10 | C | A | A | A | A | A |
| Example A11 | A11 | B | A | A | A | A | A |
| Example A12 | A12 | A | C | C | A | A | C |
| Example A13 | A13 | A | A | A | A | C | A |
| Example A14 | A14 | A | B | B | A | A | A |

TABLE 5

| | Ink | Image density | Nozzle clogging - After being left for a long time | Nozzle clogging - During image formation | Curling | Drying property | Dispersion stability |
|---|---|---|---|---|---|---|---|
| Example B1 | B1 | A | A | A | A | A | A |
| Example B2 | B2 | A | A | A | A | A | A |
| Example B3 | B3 | A | A | A | A | A | A |
| Example B4 | B4 | A | A | A | A | A | A |
| Example B5 | B5 | B | A | A | A | A | A |

TABLE 6

| | Ink | Image density | Nozzle clogging - After being left for a long time | Nozzle clogging - During image formation | Curling | Drying property | Dispersion stability |
|---|---|---|---|---|---|---|---|
| Comparative Example C1 | C1 | A | A | C | A | A | D |
| Comparative Example C2 | C2 | A | D | A | A | A | A |
| Comparative Example C3 | C3 | A | D | A | B | A | D |
| Comparative Example C4 | C4 | A | A | D | A | A | A |
| Comparative Example C5 | C5 | A | A | A | D | A | A |
| Comparative Example C6 | C6 | A | D | C | A | A | D |
| Comparative Example C7 | C7 | A | D | B | C | A | D |
| Comparative Example C8 | C8 | A | B | D | A | A | D |
| Comparative Example C9 | C9 | A | A | A | D | A | A |
| Comparative Example C10 | C10 | A | D | D | C | A | D |
| Comparative Example C11 | C11 | D | A | A | A | A | A |
| Comparative Example C12 | C12 | A | D | D | A | A | D |

TABLE 7

| | Ink | Processing liquid | Image density | Nozzle clogging - After being left for a long time | Nozzle clogging - During image formation | Curling | Drying property | Dispersion stability | Inter color bleeding (ICB) |
|---|---|---|---|---|---|---|---|---|---|
| Example C1 | A6 | A | A | A | A | B | A | A | A |
| Example C2 | A10 | A | A | A | A | A | A | A | A |
| Example C3 | A6 | B | A | A | A | C | A | A | A |
| Example C4 | A10 | B | A | A | A | B | A | A | A |
| Example C5 | B5 | A | A | A | A | A | A | A | A |

The following are the methods and criteria for the evaluation used in Tables 4 to 7.

—Image Density—

A solid image is printed on the whole area of one side a plain paper sheet of A4 size (C2 paper, manufactured by Fuji Xerox Co., Ltd.) with a prototype inkjet head (resolution; 600 dpi) so that the application amount of ink per area is 0.014 mg/mm$^2$. The density in the solid image region is measured by an optical density measuring instrument (X-Rite MODEL 404, manufactured by X-Rite, Inc.) and evaluated according to the following criteria.

A: 1.40 or more
B: 1.30 or more and less than 1.40
C: 1.20 or more and less than 1.30
D: Less than 1.20

—Nozzle Clogging (After Being Left for a Long Time)—

After printing has been performed with a prototype inkjet head (resolution; 600 dpi), the inkjet head is left for one week at 23° C. and 55% RH, with a cap on the nozzle face. Thereafter, the ratio of the nozzles capable of ejecting without having maintenance after storage with respect to the total nozzles is measured and evaluated according to the following criteria.

A: 90% or more
B: 80% or more and less than 90%
C: 70% or more and less than 80%
D: Less than 70%

—Nozzle Clogging (During Image Formation)—

After printing has been performed with a prototype inkjet head (resolution; 600 dpi), the inkjet head is left at 23° C. and 55% RH, with no cap on the nozzle face. Thereafter, printing is performed again without having maintenance and the time until printing disorders occur at a portion where image printing starts is measured according to the following criteria.

A: 60 seconds or more
B: 30 seconds or more and less than 60 seconds
C: 10 seconds or more and less than 30 seconds
D: Less than 10 seconds —Curling—

A solid image is printed on the whole area of one side of a plain paper sheet of A4 size (C2 paper, manufactured by Fuji Xerox Co., Ltd.), except a non-printed area of 8 mm from the edge of the sheet, with a prototype inkjet head (resolution; 600 dpi) so that the application amount of ink per area is 0.014 mg/mm$^2$. The printed material is then left on a plane table for two weeks at 23° C. Thereafter, the degree of curling of the printed material (the average value of distances between the four corners of the printed material and the table surface) after two weeks is measured by a slide caliper and evaluated according to the following criteria.

A: Less than 5 mm
B: 5 mm or more and less than 10 mm
C: 10 mm or more and less than 30 mm
D: 30 mm or more, or the printed material rolls up —Drying Property—

30 sheets of A4 size evaluation chart with 10% of printed area, in which solid images, linear images and characters are printed together, are continuously printed. The charts are then stacked and a pressure of 100 grams by weight/cm$^2$ is applied to the stack. The non-printed area of the chart is observed whether there are transfer smudges.

A: No transfer smudges in the non-printed area are observed
B: Transfer smudges are slightly observed in the non-printed area when a pressure is applied, but no transfer smudges are observed when pressure is not applied.
C: Transfer smudges are slightly observed in the non-printed are even when pressure is not applied
D: Transfer smudges are slightly observed even when pressure is not applied, and image density in the solid image area on the printed side is lowered due to transfer.

—Dispersion Stability—

The ink is charged in a prototype ink tank and left for two weeks at 70° C., and the rate of change in the volume average particle diameters of the particle components in the inks and the rate of change in the amount of particles having a diameter of 0.5 micrometer or more are evaluated according to the following criteria, with respect to the values of the ink before being left for two weeks as 100%.

A: The rate of change in volume average particle diameter as an absolute value is less than 5%, and the rate of change in the number of particles having a diameter of 0.5 micrometer or more as an absolute value is less than 15%.

B: The rate of change in volume average particle diameter as an absolute value is 5% or more and less than 10%, or the rate of change in the number of particles having a diameter of 0.5 micrometer or more as an absolute value is 15% or more and less than 30%.

C: The rate of change in volume average particle diameter as an absolute value is 10% or more and less than 15%, or the rate of change in the number of particles having a diameter of 0.5 micrometer or more as an absolute value is 30% or more and less than 50%.

D: The rate of change in volume average particle diameter as an absolute value is 15% or more, or the rate of change in the number of particles having a diameter of 0.5 micrometer or more as an absolute value is 50% or more.

The volume average particle diameter of particle components in the ink is measured by sampling two microliters of sampled ink, using Accusizer™ 770 Optical Particle Sizer (manufactured by Particle Sizing Systems). As a parameter for measurement, the density of the pigment is input as the density of dispersed particles. The density of the pigment can be calculated by measuring the density of the pigment powder obtained by heating and drying the pigment dispersion, using a density gauge or density bottle.

—Bleeding—

Character images of 2 to 8 points are printed on an A4 size plain paper sheet (C2 paper, manufactured by Fuji Xerox Co., Ltd.) with a prototype inkjet head (resolution; 600 dpi) by applying a processing liquid and an ink in this order. The bleeding of the character images are visually observed and evaluated according to the following criteria.

A: No bleeding is observed and all points of the character images are clear.
B: Bleeding is slightly observed, but all points of the character images are clear.
C: Part of character images of smaller points are not very clear to read.
D: Character images having an intricate structure and a size of 4 point or less are not clear to read.

—Bleeding of Black Character Images Against a Color Background (ICB)—

Commercially available color inks of cyan, magenta and yellow (inks for use in an inkjet printer Workcentre B 900, manufactured by Fuji Xerox Co., Ltd.) are charged in an ink tank that supplies ink to a prototype inkjet head (resolution; 600 dpi), instead of a black ink used for the above evaluations, and a color solid image is formed on an A4 size plain paper sheet (C2 paper, manufactured by Fuji Xerox Co., Ltd.) to prepare a color background. Onto this color sold image, a processing liquid and a black ink are further applied to form black character images of 10 point. Bleeding of the black character images are visually observed and evaluated according to the following criteria.

A: Bleeding is not observed and the border between colored and black regions is clearly detected.
B: Bleeding is not observed by naked eye, but disorders in the line are slightly observed when magnified with a loupe.
C: Bleeding is slightly observed by naked eye.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink comprising a pigment, a dispersant, a penetrating agent, water, a compound having two hydroxyl groups in the molecule, a compound having three hydroxyl groups in the molecule, and a compound having four or more hydroxyl groups in the molecule,
    the content of the pigment being in the range of from about 7% by weight to about 20% by weight;
    the content of the compound having two hydroxyl groups in the molecule being in the range of from about 1% by weight to about 10% by weight;
    the content of the compound having three hydroxyl groups in the molecule being in the range of from about 2% by weight to about 20% by weight; and
    the content of the compound having four or more hydroxyl groups in the molecule being in the range of from 42% by weight to 50% by weight.

2. The ink according to claim 1, wherein the compound having four or more hydroxyl groups in the molecule is at least one selected from the group consisting of a disaccharide, a monosaccharide, a derivative of a disaccharide or a monosaccharide, and a modified compound of a disaccharide or a monosaccharide.

3. The ink according to claim 1, wherein the dispersant is a resin.

4. An ink set comprising an ink, a liquid containing at least a coagulant and substantially no colorant,
    the ink comprising a pigment, a dispersant, a penetrating agent, water, a compound having two hydroxyl groups in the molecule, a compound having three hydroxyl groups in the molecule, and a compound having four or more hydroxyl groups in the molecule, and
    the content of the pigment being in the range of from about 7% by weight to about 20% by weight;
    the content of the compound having two hydroxyl groups in the molecule being in the range of from about 1% by weight to about 10% by weight;
    the content of the compound having three hydroxyl groups in the molecule being in the range of from about 2% by weight to about 20% by weight; and
    the content of the compound having four or more hydroxyl groups in the molecule being in the range of from 42% by weight to 50% by weight.

5. The ink set according to claim 4, wherein the compound having four or more hydroxyl groups in the molecule is at least one selected from the group consisting of a disaccharide, a monosaccharide, a derivative of a disaccharide or a monosaccharide, and a modified compound of a disaccharide or a monosaccharide.

6. The ink set according to claim 4, wherein the liquid contains a compound having two hydroxyl groups in the molecule, a compound having three hydroxyl groups in the molecule, and a compound having four or more hydroxyl groups in the molecule.

7. The ink set according to claim 4, wherein the dispersant is a resin.

8. An ink cartridge comprising a container containing at least an ink, the container being detachably attachable to an ink ejecting apparatus,
    the ink comprising a pigment, a dispersant, a penetrating agent, water, a compound having two hydroxyl groups in the molecule, a compound having three hydroxyl groups in the molecule, and a compound having four or more hydroxyl groups in the molecule, and
    the content of the pigment being in the range of from about 7% by weight to about 20% by weight;
    the content of the compound having two hydroxyl groups in the molecule being in the range of from about 1% by weight to about 10% by weight;
    the content of the compound having three hydroxyl groups in the molecule being in the range of from about 2% by weight to about 20% by weight; and
    the content of the compound having four or more hydroxyl groups in the molecule being in the range of from 42% by weight to 50% by weight.

9. The ink cartridge according to claim 8, wherein the compound having four or more hydroxyl groups in the molecule is at least one selected from the group consisting of a disaccharide, a monosaccharide, a derivative of a disaccharide or a monosaccharide, and a modified compound of a disaccharide or a monosaccharide.

10. The ink cartridge according to claim 8, wherein the container further contains a liquid comprising at least a coagulant and substantially no colorant.

11. The ink cartridge according to claim 10, wherein the liquid comprises a compound having two hydroxyl groups in the molecule, a compound having three hydroxyl groups in the molecule, and a compound having four or more hydroxyl groups in the molecule.

12. The ink cartridge according to claim 8, wherein the dispersant is a resin.

13. An ink ejecting apparatus comprising an ink cartridge comprising a container comprising at least an ink, the container being detachably attachable to an ink ejecting apparatus, and an ink ejecting unit that ejects the ink contained in the container, the ink comprising a pigment, a dispersant, a penetrating agent, water, a compound having two hydroxyl groups in the molecule, a compound having three hydroxyl groups in the molecule, and a compound having four or more hydroxyl groups in the molecule:
    the content of the pigment being in the range of from about 7% by weight to about 20% by weight;
    the content of the compound having two hydroxyl groups in the molecule being in the range of from about 1% by weight to about 10% by weight;
    the content of the compound having three hydroxyl groups in the molecule being in the range of from about 2% by weight to about 20% by weight; and
    the content of the compound having four or more hydroxyl groups in the molecule being in the range of from 42% by weight to 50% by weight.

14. The ink ejecting apparatus according to claim 13, wherein the compound having four or more hydroxyl groups in the molecule is at least one selected from the group consisting of a disaccharide, a monosaccharide, a derivative of a disaccharide or a monosaccharide, and a modified compound of a disaccharide or a monosaccharide.

15. The ink ejecting apparatus according to claim 13, wherein the container further comprised a liquid containing at least a coagulant and substantially no colorant.

16. The ink ejecting apparatus according to claim 15, wherein the liquid comprises a compound having two hydroxyl groups in the molecule, a compound having three hydroxyl groups in the molecule, and a compound having four or more hydroxyl groups in the molecule.

17. The ink ejecting apparatus according to claim 13, wherein the dispersant is a resin.

18. The ink according to claim 1, wherein the content of the pigment is in the range of from about 9% by weight to about 15% by weight.

19. The ink set according to claim 4, wherein the content of the pigment is in the range of from about 9% by weight to about 15% by weight.

20. The ink cartridge according to claim 8, wherein the content of the pigment is in the range of from about 9% by weight to about 15% by weight.

21. The ink ejecting apparatus according to claim 13, wherein the content of the pigment is in the range of from about 9% by weight to about 15% by weight.

* * * * *